United States Patent
Seibert et al.

(10) Patent No.: US 9,471,256 B2
(45) Date of Patent: Oct. 18, 2016

(54) SYSTEMS AND METHODS FOR RESTORING DATA IN A DEGRADED COMPUTER SYSTEM

(71) Applicant: Dell Products, L.P., Round Rock, TX (US)

(72) Inventors: Philip M. Seibert, Austin, TX (US); Todd Swierk, Austin, TX (US); Gary Douglas Huber, Austin, TX (US); Carlton A. Andrews, Austin, TX (US); Munif Mohammed Farhan, Round Rock, TX (US)

(73) Assignee: DELL PRODUCTS, L.P., Round Rock, TX (US)

( * ) Notice: Subject to any disclaimer, the term of this patent is extended or adjusted under 35 U.S.C. 154(b) by 270 days.

(21) Appl. No.: 14/231,668

(22) Filed: Mar. 31, 2014

(65) Prior Publication Data
US 2015/0278048 A1    Oct. 1, 2015

(51) Int. Cl.
*G06F 11/00*    (2006.01)
*G06F 3/06*    (2006.01)
*G06F 11/16*    (2006.01)
*G06F 11/20*    (2006.01)

(52) U.S. Cl.
CPC .......... *G06F 3/0683* (2013.01); *G06F 3/0619* (2013.01); *G06F 3/0647* (2013.01); *G06F 11/1662* (2013.01); *G06F 11/2094* (2013.01); *G06F 3/061* (2013.01); *G06F 3/0685* (2013.01)

(58) Field of Classification Search
CPC ............ G06F 11/2069; G06F 3/0619; G06F 3/0647; G06F 3/0683; G06F 3/0685; G06F 3/061
USPC .......................................................... 714/15
See application file for complete search history.

(56) References Cited

U.S. PATENT DOCUMENTS

| | | | |
|---|---|---|---|
| 6,763,458 B1* | 7/2004 | Watanabe | G06F 9/441 713/100 |
| 9,122,652 B2* | 9/2015 | Bennah | G06F 11/2028 |
| 9,317,686 B1* | 4/2016 | Ye | G06F 21/56 |
| 2003/0013438 A1* | 1/2003 | Darby | G06Q 30/02 455/419 |
| 2007/0168711 A1* | 7/2007 | Chen | G06F 11/2025 714/11 |
| 2012/0047110 A1* | 2/2012 | Brunet | G06F 3/0608 707/640 |
| 2012/0054477 A1* | 3/2012 | Lubars | G06F 9/4406 713/2 |
| 2012/0151257 A1* | 6/2012 | Tam | G06F 11/1417 714/15 |
| 2015/0149412 A1* | 5/2015 | Kobres | G06F 9/4416 707/640 |
| 2015/0180985 A1* | 6/2015 | Seibert | H04L 67/143 709/206 |
| 2015/0248247 A1* | 9/2015 | Andrews | G06F 3/0634 711/103 |

* cited by examiner

*Primary Examiner* — Yair Leibovich
(74) *Attorney, Agent, or Firm* — Fogarty, L.L.C.

(57) ABSTRACT

Methods and systems for restoring data in a degraded computer system are presented. In an embodiment, a method includes storing user data to a hard disk drive that is local to a user interface device. The method may also include storing a sub-set of the user data to a internal data storage device that is local to the user interface device. Additionally, the method may include copying the sub-set of the user data from the internal data storage device to a remote data storage device in response to a degradation of system performance of the user interface device. In an embodiment, the data may be retrieved from the internal data storage by an external system, even when the user interface device is in a degraded or unresponsive state.

14 Claims, 6 Drawing Sheets

| SYSTEM STATE 606 | LOCAL HARD DRIVE 602 | LOCAL PERSISTENT CACHE 604 | IMAGE STORAGE SERVER 112 |
|---|---|---|---|
| NORMAL 608 | CURRENT 616 | CURRENT 618 | CURRENT 620 |
| FAILURE 610 | LOST 622 | CURRENT 624 | STALE 626 |
| RESTORING 612 | LOST 628 | CURRENT 630 | 1) UPDATE SERVER → CURRENT 632 |
| RESTORED 614 | CURRENT 634 | CURRENT 636 | 634  640 2) RESTORE TO HDD  CURRENT 638 |

FIG. 6

SYSTEMS AND METHODS FOR RESTORING DATA IN A DEGRADED COMPUTER SYSTEM

FIELD

This disclosure relates generally to computer systems, and more specifically, to systems and methods for restoring data in a degraded computer system.

BACKGROUND

There are multiple points of failure that can render a computer nonfunctional. For example, the data storage device, such as a hard disk drive, may be inaccessible. The storage device may be intact, but logically inaccessible because of driver errors, interface errors, or malware infection. Alternatively, the storage device may be damaged and physically inaccessible. Alternatively, other issues may cause the computer system to malfunction, including power supply faults, memory faults, system bus faults, etc. In cases where the computer is nonfunctional, it may be desirable— even urgently so—to recover and preserve user data.

Prior methods for restoring the computer system include repairing damaged components, removing hard drives and directly accessing data on the drive from other systems, and making periodic backup copies of the user data on remote or removable data storage devices. All of these methods have inherent drawbacks in terms of cost, downtime, loss of data, and loss of productivity.

SUMMARY

Methods and systems for restoring data in a degraded computer system are presented. In an embodiment, a method includes storing user data to a hard disk drive that is local to a user interface device. The method may also include storing a sub-set of the user data to an internal data storage device that is local to the user interface device. Additionally, the method may include copying the sub-set of the user data from the internal data storage device to a remote data storage device in response to a degradation of system performance of the user interface device.

In a further embodiment, the method may include loading an alternate operating system on the user interface device, and copying the sub-set of the user data to a remote storage location using the alternate operating system. Such a method may also include copying the sub-set of user data from the remote storage location back to the user interface device in response to a determination that the system performance degradation has been repaired. Additionally, such a method may include copying additional user data stored on the remote data storage location back to the user interface device, the additional user data representing an image of user data established during a data backup process. As used herein, the term "image" means an external copy of user data stored in an internal data storage device. The image may include an exact replica of the user data in hard disk image form, or it may simply include a backup copy of the data in another format. As used herein, the term "user data" means data, files, code, executables, applications, or any other computer processes that generate or manipulate data on a computer system. Storage of the "user data" may be in the form of backup copies of data, files, applications, and other forms of user data, images of hard disk drives, or the like. The terms "user data," "data," and image may be used interchangeably throughout this specification.

In another embodiment, the method includes copying the sub-set of the user data to a remote data storage device further comprises copying the sub-set of the user data from the internal data storage device to an external data storage device via a direct data communication connection. In such methods, the direct data communication connection comprises a data communication connection, such as Universal Serial Bus (USB), firewire, eSata, etc. Such methods may also include establishing a direct data connection between an external data connection, such as a USB port, on the user interface device and the internal data storage devices, such as internal data storage device, hard disk drive, etc. In another embodiment, the method includes copying the sub-set of user data to an external flash memory drive. In still another embodiment, the method includes copying the sub-set of the user data to a second user interface device via a direct peer-to-peer data connection.

Embodiments of an Information Handling System (IHS) are also presented. In an embodiment, the IHS includes a processor and a memory coupled to the processor, the memory including program instructions stored thereon that, upon execution by the processor, cause the IHS a set of operations. In an embodiment, the instructions cause the IHS to store user data to a hard disk drive that is local to a user interface device, store a sub-set of the user data to an internal data storage device that is local to the user interface device, and copy the sub-set of the user data from the an internal storage device to a remote data storage device in response to a degradation of system performance of the user interface device.

Embodiments of a non-transitory computer-readable medium having program instructions stored thereon that, upon execution by an Information Handling System (IHS), cause the IHS to perform such operations are also presented.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 6 is a state table diagram illustrating another embodiment of a method for restoring data in a degraded computer system.

DETAILED DESCRIPTION

Figure 1:
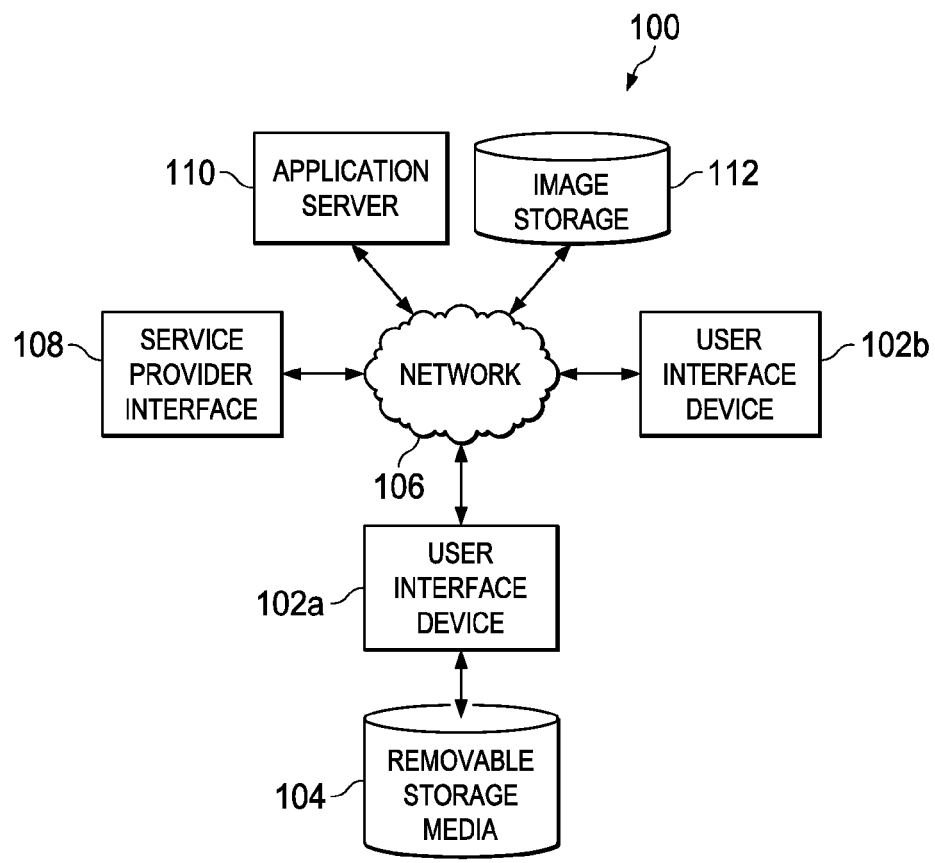
FIG. 1 is a diagram illustrating one embodiment of a system for restoring data in a degraded computer system.

FIG. 1 is a diagram illustrating one embodiment of a system 100 for restoring data in a degraded computer system. In an embodiment, the system 100 includes one or more user interface devices 102a-b. The user interface devices 102a-b may be computing devices, such as desktop computers, laptop computers, tablet computing devices, mobile computing devices, etc. In other embodiments, the user interface devices may include or be coupled to servers, networking devices, security appliances, or the like. In still other embodiments, the user interfaces may be of diverse types. For example, a first user interface device 102a may be a desktop workstation, and a second user interface device 102b may be a mobile computing device or a tablet computing device. In certain embodiments, aspects of the first user interface device 102a may be tied or related to aspects of the second user interface device 102b. For example, a selection of a user's files, accounts, configuration, applications, etc. may be shared between the first user interface device 102a and the second user interface device 102b. One of ordinary skill will recognize a variety of user interface devices 102a-b that may be configured according to the present embodiments.

In an embodiment, the system 100 may include a removable storage medium 104 which may store information used by the user interface device 102a. Examples of removable storage media 104 include flash memory drives, Secure Digital (SD) cards, optical storage disks, external magnetic disk drives, external Solid State Drives (SSD), etc. In an embodiment, the removable storage media 104 may communicate with the user interface device 102a through a data communication port, such as a Universal Serial Bus (USB) port, or the like. Alternatively, the removable storage media 104 may communicate with the user interface device 102a wirelessly through, e.g., a WiFi or Bluetooth communication interface.

User interface devices 102a-b may be configured to communicate via an interface to network 106. Network 106 may include a Local Area Network (LAN), a Wide Area Network (WAN) connection, a connection to the Internet, etc. The network 106 may include various components, such as network routing devices, network switching devices, network hubs, network firewalls, wireless access points, mobile data connections, telecommunications network backbone hardware, etc. In various embodiments, the network 106 may be configured to receive communication requests from the user interface devices 102a-b and transmit responses from other devices connected to the network 106 back to the user interface devices 102a-b.

In an embodiment, the system 100 may include one or more devices or subsystems which may be provided to service the user interface devices 102a-b. For example, service provider interface 108 may be provided to allow a service provider to communicate with the user interface device 102a. In one example, embodiment, the service provider may be a technical support technician. The technical support technician may establish a user support session, such as a chat session with a user of the user interface device 102a, b. The user support session may additionally include a remote access session, a file transfer session, a voice or video connection, etc. In an embodiment, the user support session may be requested by the user of the user interface device 102a, b. In another embodiment, the user interface device 102a, b may automatically request the user support session in response to encountering a system error.

In an embodiment, the system 100 may also include an application server 110. In such an embodiment, the application server 110 may provide the user interface devices 102a-b with access to one or more applications 110. For example, the user interface device 102a-b may operate as a thin client which displays video related to operations of an application hosted by application server 110, but does not directly handle processing of data associated with operation of the application. In a further embodiment, the user interface device 102a-b may additionally provide an interactive interface allowing the user to enter data or manipulate operation of the application. Data and commands entered by the user at the user interface device 102a, b may be communicated to application server 110 via network 106.

In one example, the application server 110 may be accessed by the user interface device 102a, b in the event of a failure being detected at the user interface device 102a. For example, in the event of a system failure of an operating system, the user interface device 102a, b may automatically switch to a fault recovery mode. In the fault recovery mode, the user interface 102a may still be used by the user to perform tasks, but the operating system may be operated on the application server 110 and the user interface device 102a may simply operate as a user interface client of the application server 110 allowing the user to enter inputs which are communicated to the application server 110 via network 106, and seeing responsive actions of the operating system on the application server 110. One of ordinary skill will recognize additional examples involving applications which may be hosted by application server 110, including word processing applications, email applications, photo editing applications, etc.

In an embodiment, image storage 112 may provide remote storage functionality for user interface device 102a. In one embodiment, the image storage 112 may store a complete image of the data stored on user interface device 102a, b. In another embodiment, the image storage 112 may store a partial image of data stored on the user interface device 102a, b. For example, a selection of files or folders stored on the user interface device 102a may be designated for storage on the image storage 112. In such an embodiment, the files or folders may be communicated to image storage 112 via network 106 for storage. In still another embodiment, incremental changes to information stored on the user interface device 102a may be communicated to image storage device 112, such that the copies of information stored on image storage 112 are synchronized with the information stored on user interface device 102a.

Figure 4:
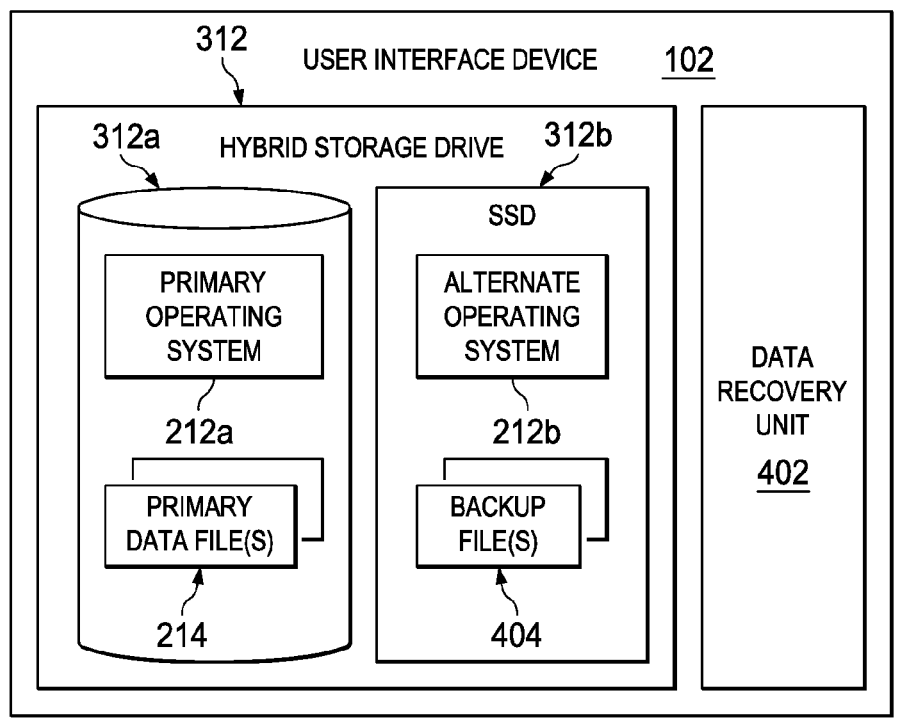
FIG. 4 is a schematic block diagram illustrating a further embodiment of a user interface device.

The system 100 of FIG. 1 is just one example of a possible system which may be used according to the present embodiments. Certain components of system 100 may be added or omitted without substantial change to the fundamental operation of the system. For example, while it may be useful to include a removable storage media 104, this component of system 100 may be omitted in various embodiments. Similarly, a user interface device 102 may access an application server during a user support session, but this component of system 100 may also be omitted in various embodiments. Additionally, image or remote data storage 112 may be useful to a service technician during a user support session, but this component may also be omitted in various embodiments. One of ordinary skill will also recognize that certain components may be added to system 100, for example as shown in FIG. 4.

Figure 2:
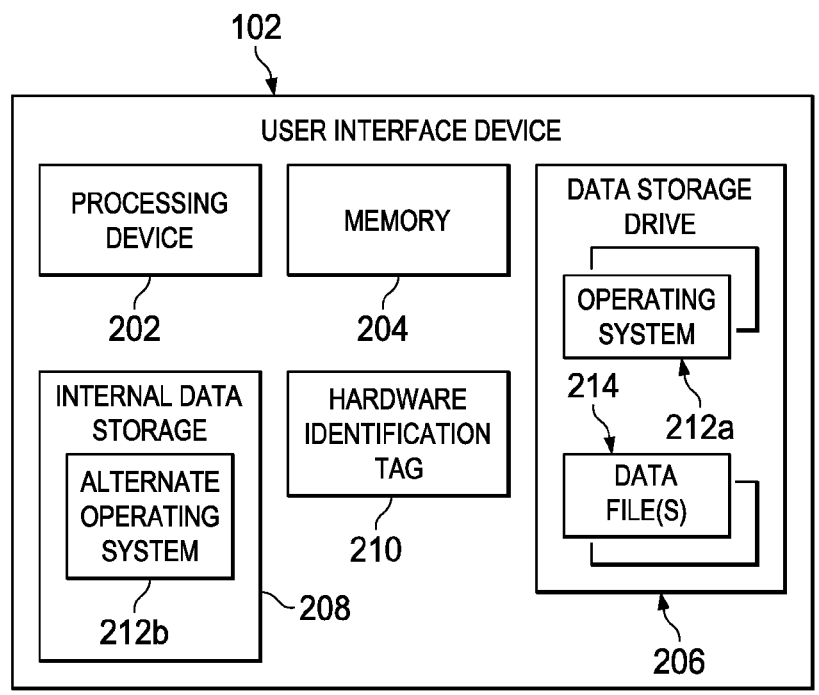
FIG. 2 is a diagram illustrating one embodiment of a user interface device configured for restoring data in a degraded computer system.

FIG. 2 is a diagram illustrating one embodiment of a user interface device 102 configured for restoring data in a degraded computer system. In an embodiment, the user interface device 102 may include a processing device 202, a memory 204, a data storage drive 206, an internal data storage 208, and a unique identifier 210. In various embodiments, the unique identifier 210 may be a hardware identification tag, a system-specific service tag, etc. One of ordinary skill will recognize alternative embodiments of a user interface device 102. For example, in certain embodiments the user interface device 102 may omit certain elements described in FIG. 2, or may add certain additional elements not described in FIG. 2.

In an embodiment, the processing device 202 may execute programmed instructions stored in the memory 204 or the data storage drive 206. For example, the data storage drive may store program code associated with a first operating system 212*a*. Portions of the code for the first operating system 212*a* may be loaded by the processing device 202 into the memory 204. In an embodiment, the first operating system is a Windows® operating system available from Microsoft® Corporation. Additionally, the processing device 202 may access data files stored in either the memory 204 or the data storage drive 206. In an embodiment, a user of the user interface device 202*a* may access data files 214 using controls provided by the operating system 212.

In certain embodiments, one or more data files 214, or the first operating system 212*a* may experience a fault. Faults may include hardware malfunctions or failures or software failures. In such an embodiment, the processor 202 may access code for system recovery. In a particular embodiment, the system recovery code may cause the processor 202 to load a second operating system, such as an alternate operating system 212*b*.

Additionally, in various embodiments, the processing device 202 may store user data on an internal data storage 208 for recovery in the event of a fault. In a particular embodiment, the internal data storage device 208 may store recently accessed files. In another embodiment, the internal data storage 208 may contain code for the alternate operating system 212*b*. In such an embodiment, the alternate operating system 212*b* may still be accessible, even if the data storage drive is inaccessible. In still other embodiments, the internal data storage 208 may store system configuration settings, system fault logs, system status logs, etc. In a particular embodiment, the internal data storage 208 may be non-volatile data storage, such as flash storage. In still a further embodiment, data in the internal data storage 208 may be accessible by removable storage media 104.

Figure 3:
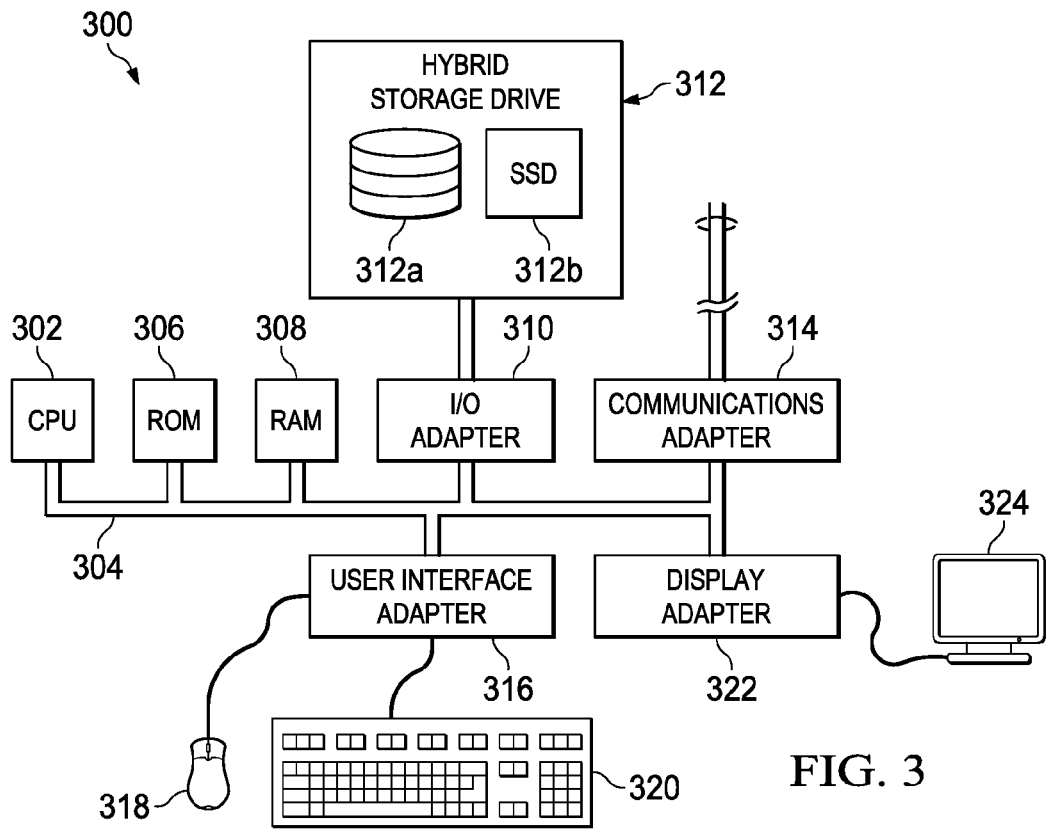
FIG. 3 is a block diagram of an example of an Information Handling System (IHS) according to some embodiments.

FIG. 3 illustrates a computer system 300 adapted according to certain embodiments of a user interface device 102*a-b*, the service provider interface 108, the application server 110, and/or the image server 112. The central processing unit (CPU) 302 is coupled to the system bus 304. In an embodiment, the processing device 202 may be implemented with CPU 302. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments. For example, the CPU 302 may execute machine-level instructions according to the exemplary operations described below with reference to FIGS. 5-6.

The computer system 300 also may include Random Access Memory (RAM) 308, which may be SRAM, DRAM, SDRAM, or the like. The computer system 300 may utilize RAM 308 to store the various data structures used by a software application configured to maintain technical support continuity across system restarts and multiple operating systems. The computer system 300 may also include Read Only Memory (ROM) 306 which may be PROM, EPROM, EEPROM, optical storage, or the like. The ROM may store configuration information for booting the computer system 300. The RAM 308 and the ROM 306 hold user and system 100 data. In various embodiments, memory 204 of user interface device 102 may be implemented with ROM 306 and/or RAM 308.

The computer system 300 may also include an input/output (I/O) adapter 310, a communications adapter 314, a user interface adapter 316, and a display adapter 322. The I/O adapter 310 and/or user the interface adapter 316 may, in certain embodiments, enable a user to interact with the computer system 300 in order to input information for interacting with operating system 212. In a further embodiment, the display adapter 322 may display a user support session, such as a chat window.

The I/O adapter 310 may connect to one or more storage devices 312, such as one or more of a hard drive, a Compact Disk (CD) drive, a floppy disk drive, a tape drive, to the computer system 300. In a particular embodiment, the storage devices 312 may be hybrid storage drives, which include both magnetic data storage disks 312*a* and a SSD 312*b*. In other embodiments, flash memory may be substituted for the SSD 312*b*. The SSD 312*b* may comprise the internal data storage 208, which in one embodiment, may store code for the alternate operating system 212*b*. The communications adapter 314 may be adapted to couple the computer system 300 to the network 106, which may be one or more of a LAN and/or WAN, and/or the Internet. The user interface adapter 316 couples user input devices, such as a keyboard 320 and a pointing device 318, to the computer system 300. The display adapter 322 may be driven by the CPU 302 to control the display on the display device 324.

The present embodiments are not limited to the architecture of system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, tablet computers, and multi-processor servers. Moreover, the present embodiments may be implemented on application specific integrated circuits (ASIC) or very large scale integrated (VLSI) circuits. In fact, persons of ordinary skill in the art may utilize any number of suitable structures capable of executing logical operations according to the described embodiments.

FIG. 4 is a diagram illustrating another embodiment of a user interface device 102 configured for restoring data in a degraded computer system. In an embodiment, the user interface device 102 may include a hybrid storage drive 312, which may include, for example, a hard disk drive (HDD) 312*a* and an associated solid state drive (SSD) 312*b*. The HDD 312*a* may store the primary operating system 212*a* and the primary data files 214. The SSD 312*b* may store the alternate operating system 212*b*. In a further embodiment, the SSD 312*b* may also store one or more backup files 404. In an embodiment, the hybrid storage drive 312 may be configured to operate according to a plurality of operation modes as defined and controlled by a data recovery unit 402. For example, the data recovery unit 402 may interface with an external data storage device to provide access to onboard user data, including the primary data files 214 and/or the backup files 404.

Under normal operating conditions, the primary operating system 212*a* may store primary data files 214 in a primary data storage device 312*a*, such as a magnetic disk drive. To do this, the primary operating system 212*a* may run a disk driver which is configured to handle storage of the primary data files 214. The disk driver may store part of the primary data files 214 in a performance block cache. The performance block cache may be stored on an SSD 312*b* storage module of a hybrid storage device 312 in one embodiment. The primary data files 214 may them be copied from the performance block cache to the primary storage device 312*a*.

Additionally, the operating system 212*a* may operate a persistent cache handler. In an embodiment, the persistent cache handler is an agent. The persistent cache handler may identify a set of the primary data files 214 to store in a persistent file cache as backup files 404. In an embodiment, the persistent file cache may also be stored on an SSD 312*b* portion of a hybrid storage drive 312.

Figure 5:
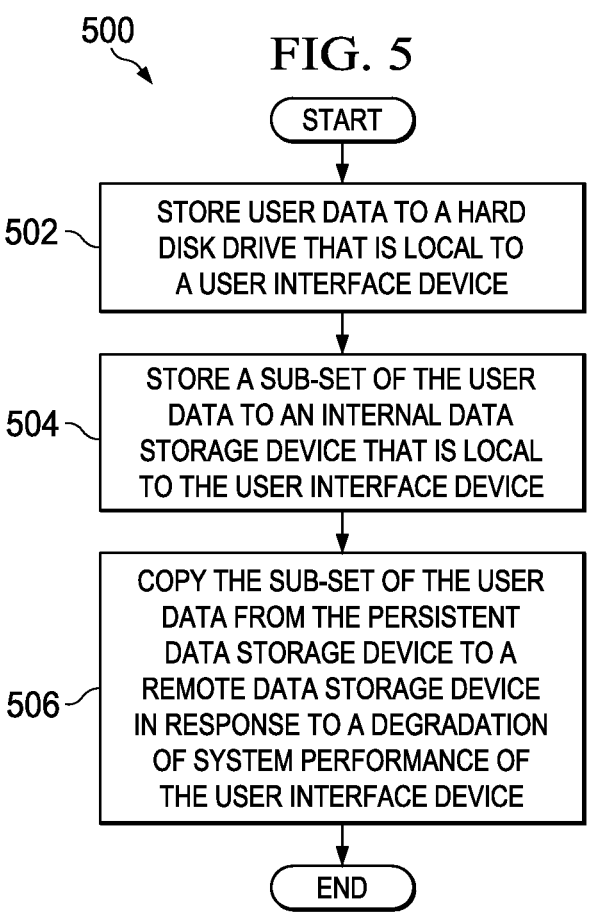
FIG. 5 is a flowchart diagram illustrating one embodiment of a method for restoring data in a degraded computer system.

FIG. 5 is a flowchart diagram illustrating one embodiment of a method 500 for restoring data in a degraded computer system. In an embodiment, the method 500 includes storing user data to a hard disk drive 312*a*—for example primary data files 214—that is local to the user interface device 102, as shown at block 502. At block 504, the method includes storing a sub-set of the user data—e.g., backup files 404—to an internal data storage device that is local to the user interface device 102. In an embodiment, the internal data storage device is the SSD 312*b* portion of the hybrid storage device 312. At block 506, the method 500 includes copying the sub-set of the user data from the internal data storage device to a remote data storage device in response to a degradation of the system performance of the user interface device. In an embodiment, the user data may be otherwise inaccessible. By way of example, the backup files 404 may be copied to a remote image store 112. In another example, the backup files 404 may be copied to removable storage media 104, such as an external data storage device coupled to the user interface device 102 via a USB or other external data bus connection. In another embodiment, the external data storage device is a healthy computing device.

FIG. 6 is a state transition table illustrating another embodiment of a method for restoring data in a degraded computer system. In FIG. 6, the state of data in a local hard drive 602, a local persistent cache 604 and a data storage server 112 are shown for each of four system states 606. In an embodiment, the local hard drive 602 is hard disk drive portion 312*a* of hybrid storage device 312 and the local persistent cache 604 is on the SSD portion 312*b* of the hybrid storage device 312. The system states 606 include a normal state 608, a failure state 610, a restoring state 612, and a restored state 614.

At the normal state 608, the user data in the local hard drive 602, the local persistent cache 604 and the image storage server 112 are all in a current and up to date as shown in blocks 616-620. In the failure state 610, the data on the local hard disk 602 may be lost as shown at block 622. The local persistent cache 604 may include current data as shown at block 624, but the image storage server 112 may have stale data as shown at block 626. The data in image storage server 112 may be stale for any one of a variety of reasons, including delays in updates from the local hard drive 602, asynchronous update configurations, etc. For example, the user may make incremental changes to user data that are stored directly in the persistent cache, but may not have been updated to the remote data storage 112. Beneficially, however, recent updates to the user data may be current in the local persistent cache 604, which can be used to update the data on the image storage server 112 as shown at arrow 634. In such an embodiment, during the restoring state 612, the data in the local hard drive 602 may still be lost as shown at block 628, but the data in both the local persistent cache 604 and the image storage server 112 may be current as shown in blocks 630-632. The current image of the user data may then be restored to either the same local hard drive 602, a replacement local hard drive, or a local hard drive on a new user interface device 102*b* as shown at arrow 640. Once the data is restored, the system may operate in a restored state 614, where the user data on the local hard drive 602, the local persistent cache 604 and the image storage server 112 are all current once again as shown at blocks 634-638.

While the table of FIG. 6 illustrates a method for restoring data using a remote image storage server 112, alternative embodiments may exist. For example, the image storage server 112 may be replaced with a network attached data storage array, a cloud storage system, or even a data backup device, such as a peripheral backup disk, USB data storage device, or a network attached backup disk. One of ordinary skill will recognize various system configurations that may be suitable for implementation according to the present embodiments.

Figure 7:
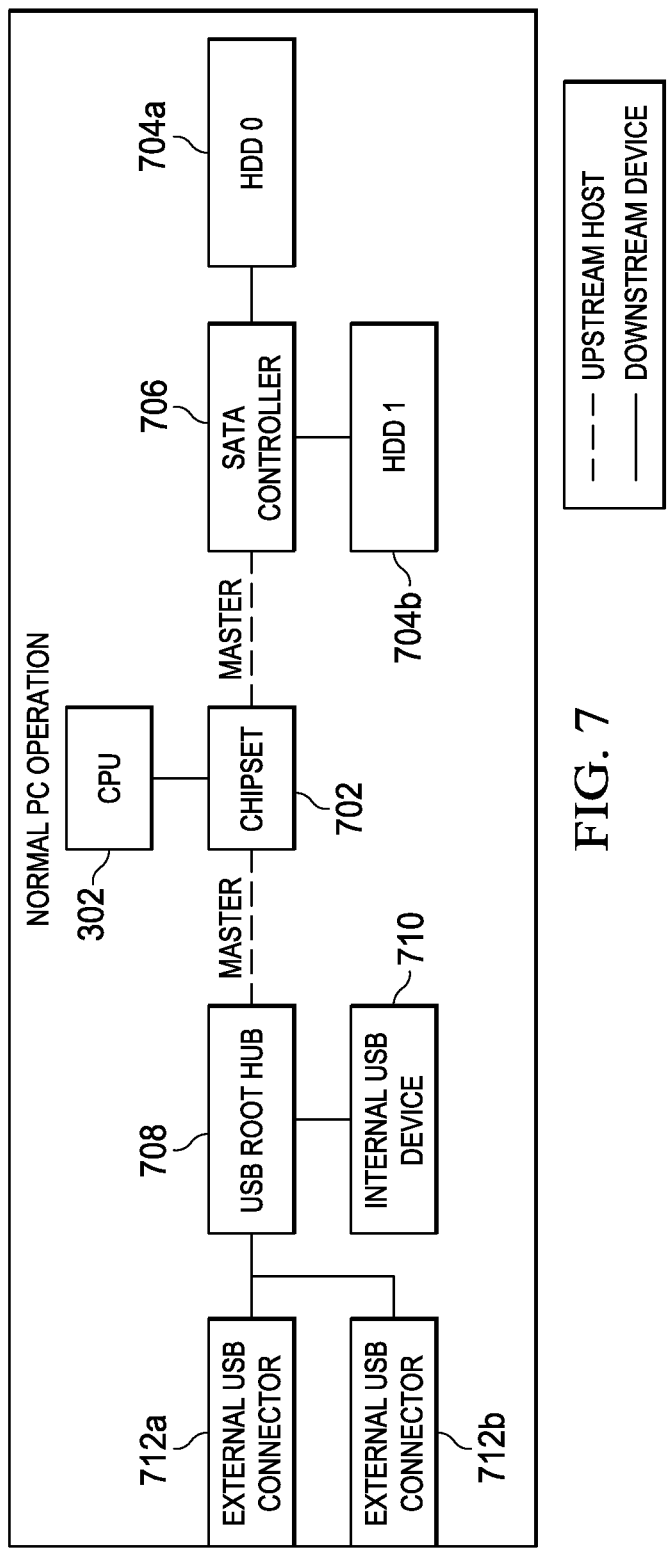
FIG. 7 is a block diagram illustrating an embodiment of a user interface device with a data access path under normal operating conditions.
Figure 8:
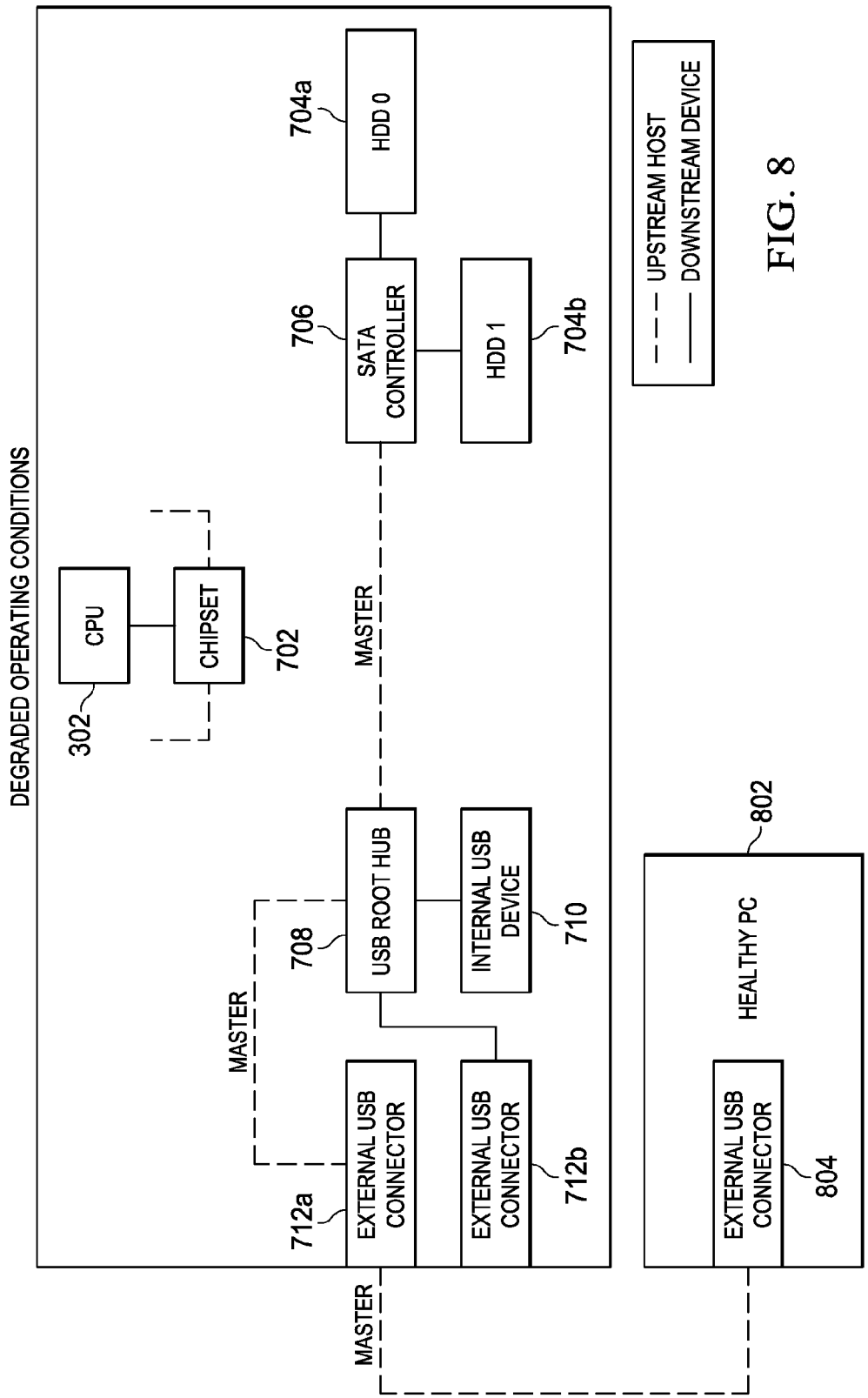
FIG. 8 is a block diagram illustrating an embodiment of a user interface device with a data access path under degraded operating conditions.

For example, FIGS. 7-8 illustrate an embodiment of a method for restoring data via an external USB connection. Beneficially, such an embodiment may enable a user to obtain data stored in the hard disk drives 704*a-b*, or from an internal data cache 604. FIG. 7 is a block diagram illustrating an embodiment of a user interface device 102 with a data access path under normal operating conditions. The user interface device may include a CPU 302 and a data communication bus chipset 702. The chipset 702 may manage communications of data along data bus 304—e.g., between SATA devices and USB devices. In such an embodiment, the chipset 702 may be coupled to both a SATA bus controller 706 and a USB root hub 708. The SATA controller 706 may provide accessibility to hard disk drives 704*a-b*. The USB root hub 708 may control data communications with one or more external USB connectors 712*a-b* as well as one or more internal USB devices 710. In an embodiment, the internal USB device 710 may be a local persistent cache 604 stored on a flash memory device, for example. Alternatively, the local persistent cache 604 may be stored on a SSD portion 312*b* of a hybrid storage device 312 implemented in place of HDD 704*a-b*. The external USB connector 712*a-b* may be used to provide accessibility to an external data storage device, such as a backup disk, a removable storage media 104, such as a flash memory drive, or to a second user interface device 102*b*. During normal operation, the chip set 702 manages communications between the SATA controller 706 and the USB root hub 708. For example, the chipset 702 acts as a master device or upstream host, while the USB root hub 708 and the SATA controller 706 act as downstream devices or slaves. In this configuration, communications between the USB root hub 708 and the SATA controller 706 can only occur if the chipset 702 is functional and in normal operation condition. Thus, if the system has failed, the data on the HDDs 704*a-b* is not ordinarily accessible via the external USB connectors 712*a-b* when the system is in a degraded operating condition.

FIG. 8 is a block diagram illustrating an embodiment of a user interface device 102 with a data access path under degraded operating conditions. In this embodiment, a second user interface device 102*b*, such as healthy PC 802 is connected to the external USB connector 712*a* of the failed user interface device 102*a* via the external USB connector 804 of the healthy device 802. In such an embodiment, the chipset 702 may be removed from the data communication path, and the USB root hub 708 may operate as the master or upstream device for the SATA controller 706. In one embodiment, the USB root hub 708 may be configured with a set of operational instructions for handling communications as master in response to a degraded state. In another embodiment, the USB root hub 708 may receive the instructions from the healthy device 802.

In such an embodiment, both data from the local hard drives 704*a*-*b* and from any data storage devices, such as local persistent cache 604, may be retrieved via the external USB connector 712*a*-*b*, even when the user interface device 102*a* is in a degraded or non-responsive state. In such embodiments, the external device may provide an external power plane to the internal data storage components.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be performed and/or other additional operations may be available. Accordingly, systems and methods described herein may be implemented or executed with other computer system configurations.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    while in a normal state under control of a primary operating system stored in a magnetic disk portion of a hybrid disk drive that is local to a user interface device, wherein the hybrid disk drive includes a magnetic disk portion and a solid-state portion, storing user data to the magnetic disk portion, storing a sub-set of the user data to the solid-state portion, and backing up the user data from the magnetic disk portion to a remote storage device, wherein the user data, the sub-set of the user data, and the backed-up user data are each current;
    while in a degraded state, launching an alternate operating system stored in the solid-state portion, wherein the user data is lost, the sub-set of the user data is current, and the backed-up user data is stale; and
    while in a restoring state under control of the alternate operating system, copying the sub-set of the user data from the solid-state portion to the remote storage device, wherein the sub-set of the user data is usable by the remote storage device to make the backed-up user data current.

2. The method of claim 1, further comprising copying the sub-set of user data from the remote storage location back to the user interface device in response to a determination that the system performance degradation has been repaired.

3. The method of claim 2, further comprising copying additional user data stored on the remote data storage location back to the user interface, the additional user data representing an image of user data established during a data backup process.

4. The method of claim 1, wherein copying the sub-set of the user data to the remote storage device further comprises copying the sub-set of the user data from the solid-state portion to an external data storage device via a direct data communication connection, the method further comprising receiving, from another user interface device at a Universal Serial Bus (USB) root hub, instructions for handling communications as a master for a Serial AT Attachment (SATA) controller of the hybrid disk drive.

5. The method of claim 4, further comprising copying the sub-set of the user data to the second user interface device via a direct peer-to-peer data connection.

6. An Information Handling System (IHS), comprising:
    a processor; and
    a memory coupled to the processor, the memory including program instructions stored thereon that, upon execution by the processor, cause the IHS to:
        while in a normal state under control of a primary operating system stored in a magnetic disk portion of a hybrid disk drive that is local to the IHS, wherein the hybrid disk drive includes a magnetic disk portion and a solid-state portion, store user data to the magnetic disk portion, store a sub-set of the user data to the solid-state portion, and back up the user data from the magnetic disk portion to a remote storage device, wherein the user data, the sub-set of the user data, and the backed-up user data are each current;
        while in a degraded state, launch an alternate operating system stored in the solid-state portion, wherein the user data is lost, the sub-set of the user data is current, and the backed-up user data is stale; and
        while in a restoring state under control of the alternate operating system, copy the sub-set of the user data from the solid-state portion to the remote storage device, wherein the sub-set of the user data is usable by the remote storage device to make the backed-up user data current.

7. The IHS of claim 6, further configured to copy the user data from the remote storage location back to the IHS in response to a determination that the degradation has been repaired.

8. The IHS of claim 7, further configured to copy additional user data stored on the remote data storage location back to the IHS, the additional user data representing an image of user data established during a data backup process.

9. The IHS of claim 6, further configured to copy the user data from the hybrid disk drive to an external data storage device of a secondary IHS via a direct data communication connection.

10. The IHS of claim 9, wherein the direct data communication connection comprises a Universal Serial Bus (USB) connection.

11. The IHS of claim 10, further configured to establish a data connection between a USB port on the IHS and the hybrid disk drive bypassing a chipset of the IHS by receiving, at the USB port from the secondary IHS, instructions for handling communications as a master for a Serial AT Attachment (SATA) controller of the hybrid disk drive.

12. The IHS of claim 11, wherein the IHS is in an otherwise unresponsive state, and wherein the hybrid disk drive receives power from the secondary IHS for copying the user data from the hybrid disk drive to the external data storage device.

13. A non-transitory computer-readable medium having program instructions stored thereon that, upon execution by an Information Handling System (IHS), cause the IHS to:

while in a normal state under control of a primary operating system stored in a magnetic disk portion of a hybrid disk drive that is local to the IHS, wherein the hybrid disk drive includes a magnetic disk portion and a solid-state portion, store user data to the magnetic disk portion, store a sub-set of the user data to the solid-state portion, and back up the user data from the magnetic disk portion to a remote storage device, wherein the user data, the sub-set of the user data, and the backed-up user data are each current;

while in a degraded state, launch an alternate operating system stored in the solid-state portion, wherein the user data is lost, the sub-set of the user data is current, and the backed-up user data is stale; and while in a restoring state under control of the alternate operating system, copy the sub-set of the user data from the solid-state portion to the remote storage device, wherein the sub-set of the user data is usable by the remote storage device to make the backed-up user data current.

14. The non-transitory computer-readable medium of claim 13, further configured to cause the IHS to copy the sub-set of the user data from the solid-state portion to an external data storage device of a secondary IHS via a direct data communication connection by receiving, from the secondary IHS at a Universal Serial Bus (USB) root hub, instructions for handling communications as a master for a Serial AT Attachment (SATA) controller of the hybrid disk drive while bypassing a chipset of the IHS, wherein the hybrid disk drive receives power from the secondary IHS via the USB root hub for copying the sub-set of the user data from the hybrid disk drive to the external data storage device.

* * * * *